United States Patent Office 3,349,074
Patented Oct. 24, 1967

3,349,074
WATER-SOLUBLE AZO DYESTUFFS
Herbert Francis Andrew, Manchester, England, assignor to Imperial Chemical Industries Limited, London, England, a corporation of Great Britain
No Drawing. Filed Dec. 16, 1963, Ser. No. 330,562
Claims priority, application Great Britain, Dec. 19, 1962, 47,994/62; Jan. 18, 1963, 2,260/63
7 Claims. (Cl. 260—146)

This invention relates to new azo compounds. More particularly the invention relates to water-soluble metal complex azo compounds which contain reactive triazine or pyrimidine substituents, by means of which the compound can behave as a "reactive" dyestuff for textile materials containing acylatable amino and hydroxyl groups, such as natural and regenerated cellulose, wool, silk and polyamide fibrous materials, and are of particular value for the dyeing of leather.

Whilst it is known that the commercially-available "reactive" dyestuffs, developed primarily for the colouration of cellulose textile materials can be used for colouring leather, it is found in practice that the properties necessary to achieve good results on cellulose materials differ markedly in a number of respects from those advantageous for leather. One of the more important properties for a dyestuff for leather is its ability to penetrate the leather adequately but not too readily during dyeing. A dyestuff which does not penetrate adequately and only colours a thin skin under the surface suffers from the disadvantage that the customary subsequent buffing treatments to the leather give rise to a variation in shade. On the other hand, a highly penetrative dyestuff gives weak shades and is relatively uneconomic in use.

It has now been found that certain "reactive" dyestuffs of the structure indicated hereinafter have properties most desirable for leather, having adequate but not too high a penetration, and affording principally strong brown shades but also other shades, having excellent fastness to washing, to rubbing and to light.

The compounds are water-soluble metal-complex azo compounds which contain copper, chromium or cobalt in complex union with an azo compound of the formula:

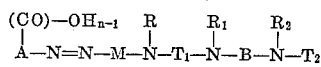

wherein M stands for a 1-hydroxy-3-sulpho-naphthalene radical connected to the azo group in the 2-position of the naphthalene nucleus and having the

group attached to the 6- or 7-position of the naphthalene nucleus directly or through an anilino group, $n$ has the value 1 or 2,
A stands for a benzene or a naphthalene radical carrying the $(CO)OH_{n-1}$ group in ortho position to the azo group,
R, $R_1$ and $R_2$ independently stand for hydrogen or for alkyl groups having up to 4 carbon atoms,
$T_1$ stands for a linking triazine or a pyrimidine nucleus,
$T_2$ stands for a dichloro-s-triazine, trichloropyrimidine or a 5-cyano-dichloropyrimidine radical,
B represents a monoazo radical of the formula

wherein D is a benzene nucleus, which can optionally be substituted in ortho position to one of the nitrogen atoms by a chlorine atom or a nitro, sulphonic acid or carboxylic acid group, and E is the aromatic nucleus arising from a p-coupling primary or secondary amine of the benzene or naphthalene series or is a 5-pyrazolone radical attached to the azo group at the 4-position of the pyrazole nucleus and carrying in the 1-position of the pyrazole nucleus a mono- or dicyclic radical of the benzene series to which the amino nitrogen atom is attached.

Broadly the new compounds can be considered to comprise an essentially brown, violet or tertiary shade metal complex dyestuff linked by the radical $T_1$ to a second azo moiety represented by B which is essentially yellow to orange in colour and which carries a reactive triazine or pyrimidine nucleus represented by $T_2$.

Where the metal in complex union with the compound of Formula 1 is copper, complexes having one atom of metal linked to one molecule of the compound are concerned; when the metal is cobalt or chromium, complexes having one atom of metal linked to two molecules of the compound are concerned.

The benzene and naphthalene radicals represented by A are derived from diazo components of the benzene and naphthalene series having a hydroxyl, alkoxy or carboxylic acid group ortho to the diazotisable amino group and can contain other substituents, such as chlorine atoms, or nitro, acetylamino or sulphonic acid groups.

The radical M can be represented, for example, by the formula:

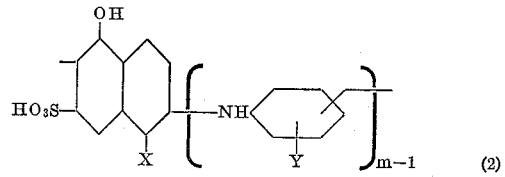

where X stands for a hydrogen or a chlorine atom or for a sulphonic acid group, Y for a hydrogen atom or a sulphonic acid group and $m$ for 1 or 2; or by the formula:

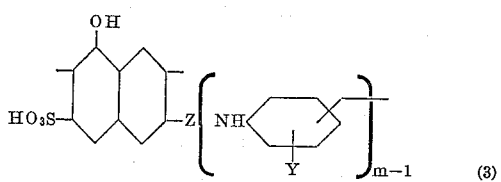

where Y and $m$ have the meanings just stated and Z stands for a hydrogen atom or a sulphonic acid group.

As examples of alkyl groups which can be represented by R, $R_1$ and $R_2$ there are preferred n-alkyl radicals having 1 to 4, inclusive, carbon atoms, i.e. methyl, ethyl, propyl and butyl.

The triazine or pyrimidine nucleus represented by T, is essentially a linking group and any substituent, attached thereto has little effect on the capability of acting as a dyestuff for leather. As examples of substituents which can be present on $T_1$, there may be mentioned bromine or, preferably, chlorine atoms, sulphonic acid groups, thiocyano groups, negatively substituted aryloxy and arylthio groups, such as sulphophenoxy, sulphophenylthio, nitrosulphophenoxy, disulphophenoxy and sulphonaphthoxy; groups of the formula:

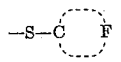 (4)

wherein F represents the group of atoms necessary to form a 5- or 6-membered heterocyclic ring which may carry substituents or form part of a fused ring system; quaternary ammonium or pyridinium groups, groups of the formula:

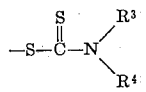 (5)

wherein $R^3$ and $R^4$ each represents the same or different alkyl, cycloalkyl, aryl or aralkyl groups, or $R^3$ and $R^4$ together form, together with the nitrogen atom, a 5- or 6-membered heterocyclic ring; and groups of the formula:

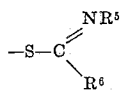 (6)

wherein $R^5$ and $R^6$ may be the same or different and each represents a hydrogen atom or an alkyl, aryl or aralkyl group; also amino and hydroxyl groups, mono- or di-substituted amino groups, etherified hydroxyl and etherified mercapto groups; in the case of substituted amino groups, this class includes, for example, (a) mono- and di-alkylamino groups in which the alkyl groups preferably contain at most 4 carbon atoms, and which may also contain such substituents as chlorine atoms or hydroxyl, alkoxy or sulphato groups and (b) phenylamino and naphthylamino groups preferably containing sulphonic acid substituents; in the case of etherified hydroxyl and mercapto groups, this class includes, for example, alkoxy and alkylthio groups preferably those of low molecular weight, i.e. having up to about 4 carbon atoms and unsubstituted or positively substituted phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)amino, cyclohexylamino, anilino, sulphophenylamino, disulphophenyl-amino, carboxyphenylamino and sulphocarboxyphenyl-amino, methoxy, ethoxy and butoxy, phenoxy, methyl-phenoxy, chlorophenoxy and phenylthio groups.

As examples of radicals represented by E there can be mentioned, for example,

1:4-phenylene nuclei of the formula:

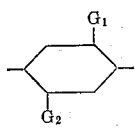 (7)

in which $G_1$ is ortho to the amino group and represents a hydrogen atom or a methyl, methoxy or ethoxy group and $G_2$ is ortho to the azo group and represents a hydrogen atom, a methyl group, a methoxy or ethoxy group or an aliphatic acylamino group (such as an acetylamino, propionylamino or ureido group) containing up to 5 carbon atoms;

1:4-naphthylene radicals of the formula:

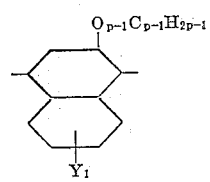 (8)

where p stands for 1 or 2 and $Y_1$ for a hydrogen atom or a sulphonic acid group;

5-pyrazolone radicals of the formula:

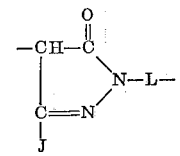 (9)

in which J represents a methyl or carboxylic acid group and L stands for a benzene nucleus which may be substituted, for example by chlorine, methyl or sulphonic acid, or for a 2,2'-disulpho-4,4' stilbene radical.

The water-soluble metal complex azo compounds of the invention can be obtained by reacting together cyanuric chloride, 5-cyano-2,4,6-pyrimidine or 2,4,5,6-tetrachloropyrimidine and a metal-complex aminoazo compound which contains copper, chromium or cobalt in complex union which an aminoazo compound of the formula:

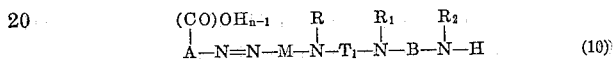 (10)

wherein the symbls A, n, M, R, $R_1$, $R_2$ $T_1$ and B have the meanings previously stated.

The above process can conveniently be carried out by stirring an aqueous suspension or solution of the cyanuric chloride or polyhalogenopyrimidine, adding an aqueous solution of the compound of Formula 10 and simultaneously or on completion of the addition, adding a solution of an acid-binding agent. The function of the acid-binding agent is to neutralise the hydrogen halide as it is formed during the reaction. Accordingly any acid-binding agent may be used provided that it is not present in such quantity that it causes hydrolysis of the reactants or causes some other side-reaction. It is preferred to use an alkali metal carbonate or bicarbonate, added at such a rate that the pH of the mixture stays within the range of 6.0 to 8.0. The temperature of reaction may be between 0° C. and 100° C. dependent on the ease with which the reaction occurs. In general cyanuric chloride reacts within a temperature range of 0 to 10° C. but polyhalogeno pyrimidines require a higher temperature of the order of 40 to 80° C.

The compounds of Formula 10 can be obtained by a combination of a condensation step and a diazotisation and coupling step. In the first step, preferably, a trihalogeno-1,3,5-triazine or a 2,4,6-trihalogenopyrimidine is condensed with a water-soluble metal-complex containing copper, chromium or cobalt in complex union with an aminoazo compound of the formula:

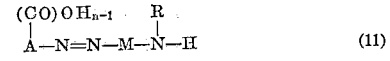 (11)

wherein A, n, M and R have the meanings stated above.

The compounds of Formula 11 can themselves be obtained by diazotising a primary aromatic amine of the benzene or naphthalene series which contains the

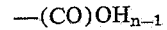

group in ortho position to the amino group and coupling the diazonium compound so obtained with a 1-hydroxy-3-sulphonaphthalene having a group of the formula —NHR attached to the 6- or 7-position of the naphthalene nucleus directly or through an anilino group.

As examples of primary aromatic amines of the benzene or naphthalene series which can be used, there may be mentioned, for example, anthranilic acid,
5-nitroanthranilic acid,
5-sulphoanthranilic acid,
4-sulphoanthranilic acid,
4-chloroanthranilic acid,
4-nitro-2-amino phenol,
4-nitro-2-aminophenol-6-sulphonic acid,
6-nitro-2-aminophenol-4-sulphonic acid, 5-nitro-2-aminophenol,
2-aminoterephthalic acid,
5-nitro-2-aminoterephthalic acid,
6-nitro-1-amino-2-naphthol-4-sulphonic acid,
4-chloro-2-aminophenol-6-sulphonic acid,
6-chloro-2-aminophenol-4-sulphonic acid,
2-aminophenol-4-sulphonic acid and
2-aminophenol-4:6-disulphonic acid.

As examples of 1-hydroxy-3-sulphonaphthalene compounds which can be used, there may be mentioned, for example, 2-amino-5-naphthol-7-sulphonic acid,
1-chloro-2-amino-5-naphthol-7-sulphonic acid,
2-amino-5-naphthol-1,7-disulphonic acid,
2-amino-8-naphthol-6-sulphonic acid,
2-amino-8-naphthol-3,6-disulphonic acid,
2-N-methylamino-5-naphthol-7-sulphonic acid,
2-N-methylamino-8-naphthol-6-sulphonic acid,
2-N-(4'-amino-3'-sulphophenylamino)-5-naphthol-7-sulphonic acid,
2-N-(4'-amino-3'-sulphophenylamino)-8-naphthol-6-sulphonic acid,
2-N-(4'-N'-methylamino-3'-sulphophenylamino)-8-naphthol-6-sulphonic acid, and
2-N-(4'-N'-methylamino-3'-sulphophenylamino)-5-naphthol-7-sulphonic acid.

The aminoazo compounds of Formula 11 can be converted to the required metal complex by customary methods, for example by heating the compound in a weakly acid, neutral or alkaline aqueous solution with a salt of the metal concerned, for example, chromium acetate, cobalt chloride or copper sulphate.

For introduction of the radical

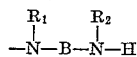

into the compound of Formula 10, the reaction product of the trihalogeno-1,3,5-triazine or trihalogenopyrimidine, or the primary condensation product of one of these, with the metal complex of the aminoazo compound of Formula 11, is first reacted with one of the following:

(a) A coupling component of the formula

H—E—NHR₁ or (b) A compound which contains the NHR₁ group and a second group which although diazotisable, will not enter the condensation under the conditions used with the trihalogeno-1,3,5-triazine or the trihalogenopyrimidine or the primary condensation product of one of these;

Thereafter in case (a) the product so obtained is coupled with a diazonium compound obtained from an aromatic diamine of the formula NH₂—D—NHR₂ where D and R₂ have the meanings stated above, in which only the depicted —NH₂ group diazotises;

In case (b) the product so obtained is diazotised and coupled with a coupling component of the formula

H—E—NHR₂ where E and R₂ have the meanings stated above.

The new dyestuffs of the invention wherein B of Formula 1 stands for the radical of a monoazo dyestuff containing a 5-pyrazolone radical of the type stated above (for example, where the radical E has the structure set out under Formula 9 above) can also be obtained by coupling if, in the above processes just stated for manufacture of compounds of Formula 10:

In case (a) the product obtained by condensation with the coupling component H—E—NHR₁ is coupled instead with a diazonium compound obtained from an aromatic amine of the formula

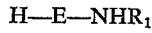

where D, R₂ and T₂ have the meaning stated above, and

In case (b) the product obtained by condensation with the said compound is diazotised and coupled instead with a pyrazolone coupling component which carries in the 1-position of the pyrazole nucleus and a mono- or di-cyclic radical of the benzene series to which a

(where R₂ and T₂ have the meanings stated above) group is attached.

As examples of aromatic diamines which can be used in case (a) there may be mentioned, for example, 1,3-phenylene diamine-4-sulphonic acid, 1,4-phenylene diamine-3-sulphonic acid and 2-nitro-, 2-chloro- and 2-carboxy-1,4-phenylene diamines.

As examples of diazotisable compounds which can be used in case (b), there may be mentioned, for example, those named in the last preceding paragraph, also 4-aminophenylsulphamic acid,
3-aminophenylsulphamic acid,
2-chloro-4-aminophenylsulphamic acid,
2-methoxy-5-methyl-4-aminophenylsulphamic acid and
4-N-methylaminophenylsulphamic acid.

As examples of coupling components of the formula H—E—NHR₁ or H—E—NHR₂, there may be mentioned, for example, aniline, o- and m-toluidines, 2,5-xylidine, o- and m-anisidines, 2,5-dimethoxyaniline and 2-methoxy-5-methylaniline and the N-methyl and N-ethyl derivatives of these compounds also α-naphthylamine,
1-naphthylamine-6- and
7-sulphonic acids and
2-methoxy-1-naphthylamine-6- and
7-sulphonic acids,
1-(3'-aminophenyl)-3-methyl-5-pyrazolone,
1-(4'-aminophenyl)-3-methyl-5-pyrazolone,
1-(3'-amino-4'-sulphohenyl)-3-methyl-5-pyrazolone,
1-(4'-amino-3'-sulphophenyl)-3-methyl-5-pyrazolone,
4-amino-4'-(3''-methylpyrazol-5''-on-1''-yl)stilbene-2,2'-disulphonic acid,
1-(3'-amino-2'-methyl-5'-sulphophenyl)-3-methyl-5-pyrazolone, and the corresponding compounds having a carboxylic acid group in place of the methyl group in the 3-position of the pyrazole nucleus.

Where it is desired that the triazine or pyrimidine nucleus represented by T₁ in Formula 10 should contain a substituent other than a halogen atom, this substituent can conveniently be introduced after the condensation and diazotisation steps mentioned above.

Thus an amino or substituted amino group can be introduced by reaction with ammonia or a primary or secondary amine; an alkoxy or aryloxy (including negatively substituted aryloxy) group can be introduced by reaction with an alcohol, or aromatic hydroxyl compound; a sulphonic acid group can be introduced by reaction with an alkali metal sulphite; a thiocyano group can be introduced by reaction with potassium thiocyanate; a group of Formula 4 can be introduced by reaction with alkali metal salt of a mercaptoheterocyclic compound such as 2-mercaptobenzthiazole, 2-mercaptobenzselenazole, 2-mercaptobenzimin-azole, 2 - mercaptobenzoxazole, 2 - mercaptopyridine, 2-mercapto-6-methoxybenzthiazole, 2-mercapto - 6 - acetyl aminobenzthiazole, 2-mercapto-6 - sulphobenzthiazole; a quaternary group can be introduced by treatment with pyridine or other tertiary amine; a group of Formula 5 above can be introduced by reaction with the appropriately substituted alkali dithiocarbamate such as sodium diethyldithiocarbamate, sodium dimetyldithiocarbamate, sodium diphenyldithiocarbamate and sodium pentamethylenedithiocarbamate; and a group of Formula 6 above can be introduced by reaction with a thioamide such as thioacetamide and thioacetanilide.

The new water-soluble metal-complex azo compounds have high tinctorial strength and, in addition to their use for dyeing leather are valuable for colouring wool, silk, polyamide and more particularly natural and regenerated cellulose fibrous materials by the commonly-used methods applicable to "reactive" dyestuffs. For example, wool, silk and polyamide fibres can be dyed from an acid, neutral or weakly alkaline dyebath whereas cotton and other natural and regenerated cellulose materials may be dyed or printed with the new dyestuffs using an acid-binding agent to link the dyestuff directly to the fibre, for example as described and claimed in United Kingdom specifications Nos. 797,946, 798,121, 816,925, 819,585, 840,470, 822,047 and 838,336, or using a resin and acid catalyst to act as an intermediate link, for example by the methods described and claimed in United Kingdom specifications Nos. 846,505 and 888,905.

The invention is illustrated but not limited by the following examples in which parts and percentages are by weight.

Example 1

A solution of 21 parts of the sodium salt of 1:4-phenylenediamine-3-sulphonic acid in 140 parts of water is added to a solution of 59.25 parts of the tri-sodium salt of the 1:2-chromium complex of 2-(4':6'-dichloro-1':3':5'-triazin-2'-ylamino) - 6 - (2'-carboxyphenylazo)-5-hydroxynaphthalene-7-sulphonic acid (which may be obtained as described in Example 1 of British patent specification No. 878,527) in 800 parts of water and the mixture is heated for 2 hours at 40° C., the pH being maintained at 7 by the gradual addition of a 10% aqueous solution of sodium carbonate. 170 parts of sodium chloride added and the precipitate is filtered off.

To a solution of 15.09 parts of the tetra-sodium salt of the bis-monochlorotriazinyl compound so obtained in 300 parts of water, there are added 11 parts of 2 N aqueous sodium nitrite solution and the mixture is added with stirring to a mixture of 7 parts of 36% aqueous hydrochloric acid solution, 50 parts of water and 50 parts of ice. The mixture is stirred at 0 to 5° C. for 15 minutes then the excess nitrous acid is removed by the addition of sulphamic acid.

2.3 parts of m-toluidine are dissolved in a mixture of 30 parts of water and 15 parts of 2 N aqueous hydrochloric acid solution and the mixture is stirred at 0° to 5° C. The suspension of the tetrazonium compound is added together with sufficient sodium acetate to maintain the mixture alkaline to Congo Red paper and the mixture is then stirred for 16 hours. The mixture is then filtered and the residue on the filter is washed with 30 parts of acetone.

A solution of 5.2 parts of the tetra sodium salt of the diaminotetrakisazo compound so obtained is 150 parts of water is added to a stirred mixture of 2 parts of cyanuric chloride, 15 parts of acetone and 20 parts of water at 0 to 5° C., the pH being maintained at 7 by the addition of a 2 N aqueous solution of sodium carbonate. 4.7 parts of sodium diethylmethanilate and 0.3 part of sodium hydrogen sulphate are added, the dyestuff is precipitated by addition of 15 parts of sodium chloride and isolated by filtration. The filter cake is washed with 30 parts of acetone, then pasted with 0.94 part of sodium diethylmetanilate and 0.06 part of sodium hydrogen sulphate and dried.

The product so obtained is the 1:2-chromium complex of the compound of the formula:

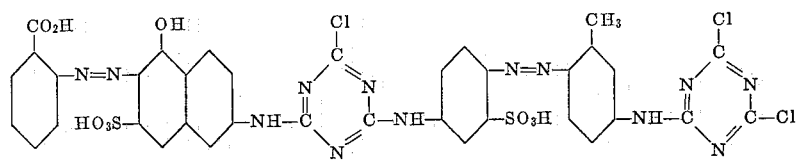

It dyes leather in brown shades fast to light and wet treatments. Furthermore, when used to dye wooled sheep skins by an immersion method the dye yields brown shades having good reserve of the wool portion.

The following table summarizes further examples of the invention obtained by a process similar to that described in Example 1. One molecular proportion of the halogenoheterocyclic compound listed in column 3 is condensed successively with one-half of one molecular proportion of the 1:2 chromium (or cobalt) complex of the aminomonoazo compound listed in column 2 and one molecular proportion of the diamine listed in column 4, one molecular proportion of the diaminodiazo compound so obtained is tetrazotized and coupled with two molecular proportions of the coupling component listed in column 5 and the diaminotetrakisazo compound so obtained is condensed with two molecular proportions of the halogenoheterocyclic compound listed in the sixth column of the table.

| Ex. | 2 | 3 | 4 | 5 | 6 | Shade |
|---|---|---|---|---|---|---|
| 2 | Cyanuric chloride | 2-amino-6-(2'-carboxyphenyl-azo)-5-naphthol-7-sulphonic acid (Cr). | 1,4-phenylene diamine-2-sulphonic acid. | 1-naphthylamine-6-sulphonic acid. | Cyanuric chloride | Brown. |
| 3 | ___do___ | ___do___ | ___do___ | 1-naphthylamine-7-sulphonic acid. | ___do___ | Do. |
| 4 | ___do___ | ___do___ | ___do___ | 2-methoxy-1-naphthylamine-6-sulphonic acid. | ___do___ | Do. |
| 5 | ___do___ | ___do___ | ___do___ | N-methylaniline | ___do___ | Do. |
| 6 | ___do___ | ___do___ | ___do___ | 4-amino-4'-(3''-methyl-pyrazal-5''-on-1''-yl) stilbene-2,2'-disulphonic acid. | ___do___ | Do. |
| 7 | ___do___ | ___do___ | ___do___ | m-Ureidoaniline | 5-cyano-2,4,6-trichloro-pyrimidine. | Do. |
| 8 | ___do___ | ___do___ | 1,3-phenylene diamine-4-sulphonic acid. | 1-naphthylamine-7-sulphonic acid. | Cyanuric chloride | Do. |
| 9 | ___do___ | ___do___ | ___do___ | 1-naphthylamine-6-sulphonic acid. | ___do___ | Do. |

| Ex. | 2 | 3 | 4 | 5 | 6 | Shade |
|---|---|---|---|---|---|---|
| 10 | Cyanuric chloride | 2-amino-6-(2'-carboxyphenylazo)-5-naphthol-7-sulphonic acid (Cr.). | 1,4-phenylene diamine-2-sulphonic acid. | 1-(3'-amino-4'-sulphophenyl)-3-methyl-5-pyrazolone. | Cyanuric acid. | Brown. |
| 11 | ___do___ | ___do___ | ___do___ | m-Toluidine | ___do___ | Do. |
| 12 | ___do___ | 1-chloro-2-amino-6-(2'-carboxyphenylazo)-5-naphthol-7-sulphonic acid (Cr). | ___do___ | 1-naphthylamine-7-sulphonic acid. | 5-cyano-2,4,6-trichloropyrimidine. | Do. |
| 13 | ___do___ | 2-amino-6-(2'-hydroxy-3'-sulpho-5'-nitrophenylazo)-5-naphthol-1,7-disulphonic acid (Co). | 1,4-phenylene diamine-3-sulphonic acid. | ___do___ | ___do___ | Do. |
| 14 | ___do___ | ___do___ | ___do___ | 1-naphthylamine-6-sulphonic acid. | ___do___ | Do. |
| 15 | ___do___ | 2-amino-7-(2'-hydroxy-3'-sulpho-5'-nitrophenylazo)-8-6-sulphonic acid (Co). | ___do___ | ___do___ | ___do___ | Do. |
| 16 | ___do___ | ___do___ | ___do___ | 1-naphthylamine-7-sulphonic acid. | ___do___ | Do. |
| 17 | ___do___ | ___do___ | 1,3-phenylene diamine-4-sulphonic acid. | m-Toluidine | 2,4,5,6-tetrachloropyrimidine. | Do. |
| 18 | ___do___ | 2-methylamino-6-(2'-carboxyphenylazo)-5-naphthol-7-sulphonic acid (Cr). | 1,4-phenylene diamine-3-sulphonic acid. | 1-naphthylamine-6-sulphonic acid. | Cyanuric chloride | Do. |
| 19 | ___do___ | ___do___ | ___do___ | 1-naphthylamine-7-sulphonic acid. | ___do___ | Do. |
| 20 | ___do___ | 2-amino-6-(2'-carboxyphenylazo)-5-naphthol-7-sulphonic acid (Co). | ___do___ | m-Toluidine | ___do___ | Orange-brown. |
| 21 | ___do___ | ___do___ | ___do___ | 1-naphthylamine-6-sulphonic acid. | ___do___ | Khaki. |
| 22 | ___do___ | 2-amino-6-(2'-hydroxy-5'-nitrophenylazo)5-naphthol-7-sulphonic acid. | ___do___ | ___do___ | ___do___ | Bluish-brown. |
| 23 | ___do___ | 2-amino-7-(2'-hydroxy-3'-nitro-5'-sulphophenylazo)-8-naphthol-6-sulphonic acid (Co). | ___do___ | ___do___ | ___do___ | Grey-brown. |
| 24 | ___do___ | 2-amino-6-(2'-hydroxy-3'-nitro-5'-sulphophenylazo)-5-naphthol-1,7-disulphonic acid (Cr). | ___do___ | ___do___ | ___do___ | Grey. |
| 25 | ___do___ | 2-amino-7-(2'-carboxyphenylazo)-8-naphthol-6-sulphonic acid (Co). | 1,3-phenylene diamine-4-sulphonic acid. | ___do___ | 2,4,5,6-trichloropyrimidine. | Brown. |
| 26 | ___do___ | 2-methylamino-7-(2'-hydroxy-5'-sulphophenylazo)-8-naphthol-6-sulphonic acid (Cr). | ___do___ | m-Ureidoaniline | Cyanuric chloride | Khaki. |
| 27 | ___do___ | 2-methylamino-7-(2'-hydroxy-5'-sulphamylphenylazo)8-naphthol-6-sulphonic acid (Cr). | ___do___ | ___do___ | ___do___ | Do. |
| 28 | ___do___ | 2-amino-6-(2'-hydroxy-5'-nitro-3'-sulphophenylazo)-5-naphthol-7-sulphonic acid (Cr). | 1,4-phenylene diamine-3-sulphonic acid. | 1-naphthylamine-6-sulphonic acid. | ___do___ | Brown. |
| 29 | ___do___ | 2-amino-6-(2'-carboxy-4'-sulphophenylazo)-5-naphthol-7-sulphonic acid (Cr). | ___do___ | m-Aminoacetanilide | ___do___ | Do. |
| 30 | ___do___ | 2-amino-6-(2'-carboxy-4'-nitrophenylazo)-5-naphthol-1,7-disulphonic acid (Co). | ___do___ | m-Ureidoaniline | ___do___ | Do. |

*Example 31*

Diazotised anthranilic acid is coupled with an equimolecular proportion of 2-(4' - amino - 3' - sulphophenylamino)-5-naphthol-7-sulphonic acid, the aminomonoazo compound so obtained is coverted to the copper complex and the latter is condensed with an equimolecular proportion of cyanuric chloride as described in British patent specification No. 877,859.

To a solution of 41.5 parts of the disodium salt of the dichlorotriazine compound so obtained in 1700 parts of water there is added a solution of 10.5 parts of the sodium salt of 1:4-phenylenediamine - 3 - sulphonic acid in 150 parts of water and the mixture is stirred for 2 hours at 40°–45° C., the pH of the mixture being maintained at 7 by the addition of a 10% aqueous solution of sodium carbonate. The mixture is treated with 10% w./v. of sodium chloride and the compound which is precipitated is filtered off.

40.1 parts of the trisodium salt of the compound so obtained are dissolved in 1200 parts of water, 20 parts of a 2 N aqueous solution of 2 N sodium nitrite are added and the solution is added to a stirred mixture of 250 parts of ice, 50 parts of water and 12.5 parts of 36° Tw. hydrochloric acid. The mixture is stirred for 1 hour then excess nitrous acid is removed by the addition of sulphamic acid.

12.2 parts of the sodium salt of 1-(3'-amino-2' methyl-5'-sulphophenyl) - 3 - methyl - 5 - pyrazolone are dissolved in 350 parts of water at 5°–10° C. and the above diazonium suspension is added together with sufficient sodium carbonate to keep the mixture alkaline to Brilliant Yellow. The mixture is then stirred for 16 hours, 400 parts of sodium chloride are added and the precipitated aminodisazo compound is filtered off.

A neutral solution of 39.6 parts of the tetrasodium salt of the compound so obtained in 800 parts of water is added to a suspension of 5.55 parts of cyanuric chloride in a mixture of 70 parts of acetone, 200 parts of water and 200 parts of ice, the temperature being maintained at 0°–5° C. and the pH of the mixture being kept at 6.5–7 by the addition of a 10% aqueous solution of sodium carbonate. The mixture is stirred for a further hour then 240 parts of sodium chloride are added and the mixture is filtered.

The residue on the filter is mixed with 3.74 parts of sodium diethylmetanilate and .26 part of sodium hydrogen sulphate and is then dried.

On analysis, the dyestuff composition is found to contain 2.9 atoms of organically bound chlorine per molecule and is the 1:1 copper complex of the compound of the formula:

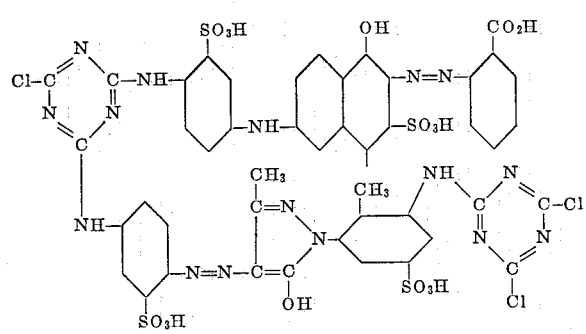

It dyes cellulose fibres or leather in red-brown shades having good fastness to light and to washing.

*Example 32*

Following the procedure of Example 31, cyanuric chloride is condensed with 1 mole of the copper complex of 2-amino-6-(2' - carboxy - 4' - sulphophenylazo) - 5-naphthol-7-sulphonic acid and one mole of 1,4-phenylene diamine-3-sulphonic acid, the product is diazotised and coupled with 1-naphthylamine-6-sulphonic acid and this product is condensed with one mole of cyanuric chloride.

The dyestuff so obtained dyes leather and cellulose textile materials in pink shades.

*Example 33*

Following the procedure of Example 31, cyanuric chloride is condensed with one mole of the copper complex of 2 - amino-6-(2'-hydroxy-5'-nitro-3'-sulphophenylazo)-5-naphthol-1,7-disulphonic acid and one mole of 1,3-phenylene diamine-4-sulphonic acid, the product is diazotised and coupled with 1-naphthylamine - 7 - sulphonic acid and this product is condensed with one mole of cyanuric chloride.

The dyestuff so obtained colours leather and cellulose textile materials in purple shades.

*Example 34*

A solution of 21 parts of the sodium salt of 1:3-phenylene diamine-4-sulphonic acid in 140 parts of water is added to a solution of 59.25 parts of the trisodium salt of the 1:2-chromium complex of 2-(4':6'-dichloro-1':3':5'-triazin - 22' - ylamino) - 6 -(2''-carboxyphenyl-azo) - 5 - naphthol - 7 - sulphonic acid in 800 parts of water. The mixture is heated for 2 hours at 40° C. the pH of the solution being maintained at 7 by the gradual addition of 10% aqueous solution of sodium carbonate. 110 parts of ammonium hydroxide liquor of s.g.=0.88 are then added and the mixture is stirred at 90° C. for 16 hours. The solution is cooled to 15° C. and is then acidified to Congo Red with concentrated hydrochloric acid. The compound which is precipitated is filtered off.

To a solution of 14.9 parts of the tertiary condensation product from cyanuric chloride so obtained in 300 parts of water there are added 11 parts of a 2 N aqueous solution of sodium nitrite and the resultant solution is added with stirring to a mixture of 7 parts of 36% aqueous hydrochloric acid solution, 50 parts of water and 50 parts of ice. The mixture is stirred at 0°–5° C. for 15 minutes, then the excess of nitrous acid is removed by the addition of sulphamic acid. 2.3 parts of m-toluidine are dissolved in a mixture of 30 parts of water and 15 parts of 2 N aqueous hydrochloric acid solution and the solution is stirred at 0°–5° C. The suspension of tetrazotised dyestuff is added to the amine solution together with sufficient sodium acetate to keep the mixture alkaline to Congo Red paper and the mixture is stirred for 16 hours. The mixture is then filtered and the residue on the filter is washed with 30 parts of acetone.

A solution of 5.2 parts of the tetrasodium salt of the diamino-tetrakisazo compound so obtained in 150 parts of water is added with stirring to a mixture of 2 parts of cyanuric chloride, 15 parts of acetone and 20 parts of water at 0°–5° C. The mixture is stirred for 2 hours at 0°–5° C., the pH of the solution being maintained at 7 by the addition of a 10% aqueous solution of sodium carbonate. 4.7 parts of sodium diethyl-metanilate and 0.3 part of sodium hydrogen sulphate are added and the dyestuff is precipitated by addition of 15 parts of sodium chloride and isolated by filtration. The filtercake is washed with 30 parts of acetone, then mixed with 0.94 part of sodium diethylmetanilate and 0.06 part of sodium hydrogen sulphate and dried.

The product so obtained is the 1:2-chromium complex of the compound:

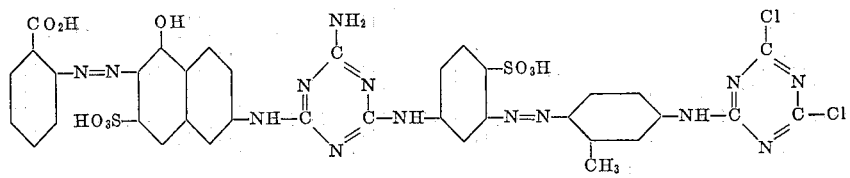

It dyes cotton, viscose and leather in brown shades fast to light and wet treatments. Wooled sheepskins are dyed brown shades having good reserve of the wool portion.

The following table summarises further examples of the invention obtained by a process similar to that described in the above example. One molecular proportion of the halogenoheterocyclic compound listed in column 2 is condensed successively with one-half of one molecular proportion of the 1:2-chromium or cobalt complex of the aminomonoazo compound listed in column 3, one molecular proportion of the diamine listed in column 4 and one molecular proportion of the compound listed in column 5; the diamino disazo compound is tetrazotised and coupled with 2 molecular proportions of the coupling component listed in column 6 and the diamino-tetrakisazo compound so obtained is condensed with two molecular proportions of the halogenoheterocyclic compound named in column 7.

| Example | 2 | 3 | 4 | 5 | 6 | 7 | Shade |
|---|---|---|---|---|---|---|---|
| 35 | Cyanuric chloride | 2-amino-6-(2'-carboxyphenylazo)-5-naphthol-7-sulphonic acid (Cr) | 1,4-phenylenediamine-2-sulphonic acid | Ammonia | 1-naphthylamine-7-sulphonic acid | Cyanuric chloride | Brown |
| 36 | ...do | ...do | ...do | ...do | 1-naphthylamine-6-sulphonic acid | ...do | Do |
| 37 | ...do | ...do | ...do | Sodium carbonate | ...do | 2,4,5,6-tetrachloropyrimidine | Do |
| 38 | ...do | ...do | ...do | ...do | ...do | ...do | Do |
| 39 | ...do | ...do | ...do | 4-amino-4'-nitrostilbene-2,2'-disulphonic acid | ...do | Cyanuric chloride | Do |
| 40 | ...do | ...do | ...do | ...do | m-Phenylene diamine | ...do | Do |
| 41 | ...do | ...do | ...do | Metanilic acid | m-Toluidine | ...do | Do |
| 42 | ...do | ...do | ...do | Butylamine | N-ethylaniline | ...do | Do |
| 43 | ...do | ...do | ...do | Ammonium hydroxide | 1-naphthylamine-7-sulphonic acid | ...do | Do |
| 44 | ...do | ...do | 1,3-phenylene diamine-4-sulphonic acid | ...do | 1-(3'-amino-4'-sulphophenyl)-3-carboxy-5-pyrazolone | ...do | Do |
| 45 | ...do | ...do | ...do | ...do | 1-(4'-amino-3'-sulphophenyl)-3-methyl-5-pyrazolone | ...do | Do |
| 46 | ...do | ...do | ...do | ...do | 1-naphthylamine-6-sulphonic acid | ...do | Do |
| 47 | 5-cyano-2,4,6-trichloropyrimidine | ...do | ...do | ...do | ...do | ...do | Do |
| 48 | Cyanuric chloride | ...do | ...do | Sulphanilic acid | m-Toluidine | ...do | Do |
| 49 | ...do | ...do | ...do | Sodium carbonate | ...do | ...do | Do |
| 50 | ...do | ...do | ...do | 2-mercapto-benzthiazole | ...do | ...do | Do |
| 51 | ...do | ...do | 4,4'-diamino-stilbene-2,2'-disulphonic acid | ...do | 1-naphthylamine-6-sulphonic acid | ...do | Do |
| 52 | 5-cyano-2,4,6-trichloropyrimidine | 2-amino-6-(2'-carboxyphenylazo)-5-naphthol-7-sulphonic acid (Co) | 1,3-phenylene diamine-4-sulphonic acid | Ammonia | ...do | ...do | Do |
| 53 | Cyanuric chloride | ...do | 1,4-phenylene diamine-2-sulphonic acid | Methylamine | ...do | ...do | Do |
| 54 | ...do | ...do | ...do | Ammonia | m-Toluidine | ...do | Do |
| 55 | ...do | ...do | ...do | ...do | ...do | ...do | Khaki |
| 56 | ...do | 2-amino-6-(2'-hydroxy-5'-nitrophenylazo)-5-naphthol-1,7-disulphonic acid (Cr) | ...do | ...do | ...do | ...do | Orange-brown |
| 57 | ...do | ...do | ...do | Aniline | 1-naphthylamine-6-sulphonic acid | ...do | Grey |
| 58 | ...do | 2-amino-6-(2'-hydroxy-3'-sulpho-5'-nitrophenylazo)-5-naphthol-1,7-disulphonic acid (Co) | ...do | Ammonia | ...do | 5-cyano-2,4,6-trichloropyrimidine | Do |
| 59 | ...do | 2-amino-6-(2'-hydroxy-5'-nitrophenylazo)-5-naphthol-7-sulphonic acid (Co) | ...do | ...do | ...do | ...do | Brown |
| 60 | ...do | 2-amino-6-(2'-carboxyphenylazo)-8-naphthol-6-sulphonic acid (Co) | ...do | ...do | ...do | ...do | Bluish-brown |
| 61 | 2,4,6-trichloro-5-cyanopyrimidine | 2-amino-7-(2'-carboxyphenylazo)-8-naphthol-6-sulphonic acid (Co) | ...do | ...do | ...do | ...do | Brown |
| 62 | Cyanuric chloride | 2-amino-6-(2'-hydroxy-5'-nitro-3'-sulphophenylazo)-8-naphthol-6-sulphonic acid (Cr) | ...do | Ethanolamine | ...do | ...do | Do |
| 63 | ...do | 2-amino-7-(2'-hydroxy-5'-nitro-3'-sulphophenylazo)-8-naphthol-6-sulphonic acid (Co) | ...do | Metanilic acid | ...do | ...do | Olive-brown |
| 64 | ...do | 2-amino-7-(2'-hydroxy-3'-sulpho-5'-nitrophenylazo)-8-naphthol-6-sulphonic acid (Co) | ...do | Aniline | ...do | ...do | Brown |
| 65 | ...do | 2-amino-6-(2'-hydroxy-5'-nitro-3'-sulphophenylazo)-8-naphthol-6-sulphonic acid (Co) | ...do | 4-amino-4'-nitrodiphenylamine-2'-sulphonic acid | ...do | ...do | Grey |
| 66 | ...do | 2-methylamino-6-(2'-carboxyphenylazo)-5-naphthol-7-nitro-8'-sulphonic acid (Cr) | ...do | ...do | ...do | ...do | Brown |
| 67 | ...do | 2-methylamino-7-(2'-hydroxy-5'-sulphophenylazo)-8-naphthol-6-sulphonic acid (Cr) | ...do | Sodium carbonate | m-Ureidoaniline | ...do | Do |
| 68 | ...do | 2-methylamino-7-(2'-hydroxy-5'-sulphophenylazo)-8-naphthol-6-sulphonic acid (Cr) | ...do | Methanol | ...do | ...do | Kahki |

Example 69

A solution of 13.05 parts of the sodium salt of 2-amino-5-naphthol-7-sulphonic acid in 100 parts of water is added during 30 minutes to a cooled suspension of 9.6 parts of cyanuric chloride in 60 parts of acetone, 100 parts of water and 100 parts of ice. The mixture is stirred for a further 30 minutes and neutralised to pH 6.5 by the addition of 10% aqueous sodium carbonate solution. 10.5 parts of the sodium salt of 1:4-phenylene diamine-2-sulphonic acid in 100 parts of water are then added and the mixture is stirred and heated at between 35° and 40° C. for 2 hours whilst the pH of the mixture is maintained at 7.0 by the addition of 10% aqueous carbonate solution. 27 parts of ammonia liquor of s.g. 0.89 are added and the mixture is stirred and heated at 80° C. for 16 hours and cooled to 10° C.

6.85 parts of anthranilic acid are diazotised in the usual manner and added to the solution. The mixture is stirred at between 5° and 10° C. and pH 7.5 for 6 hours. 120 parts of salt and 40 parts of 36% aqueous hydrochloric acid solution are added and the precipitate is filtered off and dried.

29.32 parts of the trisodium salt of the azo compound so obtained are dissolved in a mixture of 1,500 parts of water and 40 parts of glacial acetic acid. A solution of 75 parts of chromium acetate in 350 parts of water is then added and the mixture is heated at 95° C. for 18 hours. 185 parts of salt and 100 parts of 36% aqueous hydrochloric acid solution are added and the precipitate is filtered off, washed with 200 parts of 20% brine and dried.

27.4 parts of pentasodium salt of the 1:2 chromium complex so obtained are dissolved in 800 parts of water, 6.6 parts of a 40% solution of sodium nitrite are added and the mixture is added to a mixture of 20 parts of 36% aqueous hydrochloric acid solution and 50 parts of water. The mixture is stirred for 1 hour at 10° C. and the excess nitrous acid destroyed with sulphamic acid. A solution of 9.5 parts of the sodium salt of 1-naphthylamine-6-sulphonic acid in 50 parts of water is added and the pH is adjusted to 5.5 by the addition of sodium acetate. The mixture is then stirred for 18 hours at 5°–10° C., filtered and the product on the filter is dried.

29.73 parts of the heptasodium salt of the 1:2-chromium complex compound so obtained are dissolved in 400 parts of water and the solution is added to a cooled suspension of 6 parts of cyanuric chloride in 30 parts of acetone, 50 parts of ice and 50 parts of water. The mixture is stirred for 1½ hours at 0° to 5° C. whilst maintaining a pH of between 6.0 and 7.0 by the addition of a 10% aqueous solution of sodium carbonate. 3.2 parts of sodium diethylmetanilate, 0.2 part of sodium bisulphate and 106 parts of salt are then added and the precipitate is filtered off. The filtercake is slurried with 300 parts of acetone, refiltered and the product so obtained is mixed with 1.6 parts of sodium diethylmetanilate and 0.1 part of sodium bisulphate and dried.

The dyestuff so obtained is the 1:2-chromium complex of the compound of the formula:

It dyes cellulose textile materials and leather in brown shades fast to washing and to light.

Example 70

Following the procedure of Example 1, the 1:2-chromium complex of 2-amino-6-(2'-carboxyphenylazo)-5-naphthol-7-sulphonic acid is condensed with 2 moles of cyanuric chloride and the product is condensed with 2 moles of 4-aminophenylsulphamic acid. The product is tetrazotised, coupled with 2 moles of m-toluidine and the product is condensed with 2 moles of cyanuric chloride.

The dyestuff obtained has similar properties to that of Example 1; the use of 2-chloro-4-aminophenylsulphamic acid or 4-methylaminophenylsulphamic acid in place of 4-aminophenylsulphamic acid also leads to similar products.

Example 71

A solution of 42 parts (4 molecular proportions) of the sodium salt of 1:3-phenylenediamine-4-sulphonic acid in 280 parts of water is added to a solution of 59.25 parts of the trisodium salt of the 1:2-chromium complex of 2(4':6' - dichloro - 1':3':5'-triazin-2'-ylamino)-6-(2'-carboxyphenylazo)-5-naphthol-7-sulphonic acid in 800 parts of water and the mixture is heated for 2 hours at 40° C., the pH of the solution being maintained at 7 by the gradual addition of a 10% aqueous solution of sodium carbonate. The mixture is then heated to 90° C. and stirred for 16 hours, the pH of the mixture being maintained at 7–8 by the addition of a 10% solution of sodium carbonate. The mixture is allowed to cool then acidified to Congo Red with 36% aqueous hydrochloric acid solution and the precipitate is filtered off.

To a solution of 18.79 parts of the heptasodium salt of the compound so obtained in 270 parts of water there are added 20 parts of a 2 N aqueous solution of sodium nitrite and the resultant solution is added with stirring to a mixture of 15 parts of a 36% aqueous solution of hydrochloric acid, 50 parts of water and 50 parts of ice. The suspension is stirred at 0°–5° C. for 1 hour then the excess of nitrous acid is removed by the addition of sulphamic acid. The suspension is added to a solution of 9.8 parts of the sodium salt of 1-naphthylamine-6-sulphonic acid in 100 parts of water at 0°–5° C., together with sufficient sodium acetate to keep the mixture alkaline to Congo Red paper and the mixture is then stirred for 16 hours. The mixture is then filtered and the residue on the filter is washed with 30 parts of 10% brine.

A solution of 29 parts of the undecasodium salt of the compound so obtained in 400 parts of water is added with stirring to a mixture of 7.4 parts of cyanuric chloride, 40 parts of acetone and 200 parts of water at 0°–5° C. The mixture is stirred for 2 hours at 0°–5° C., the pH being maintained at 7 by the addition of a 2 N aqueous solution of sodium carbonate. 3.7 parts of potassium dihydrogenphosphate and 2.1 parts of disodium hydrogen phosphate are added, the dyestuff is precipitated by addition of 150 parts of sodium chloride and isolated by filtration. The filtercake is washed with 30 parts of acetone then pasted with 1.85 parts of potassium dihydrogen phosphate and 1.05 parts disodium hydrogen phosphate and dried.

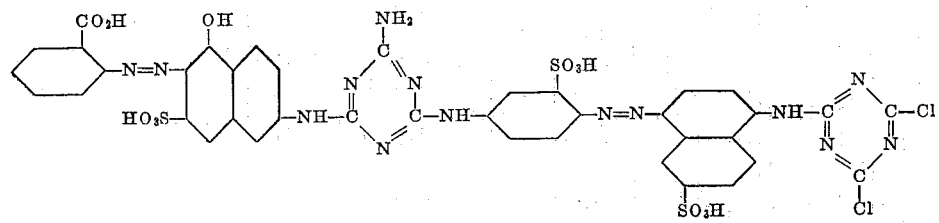

The product so obtained is the 1:2-chromium complex of the compound of the formula:

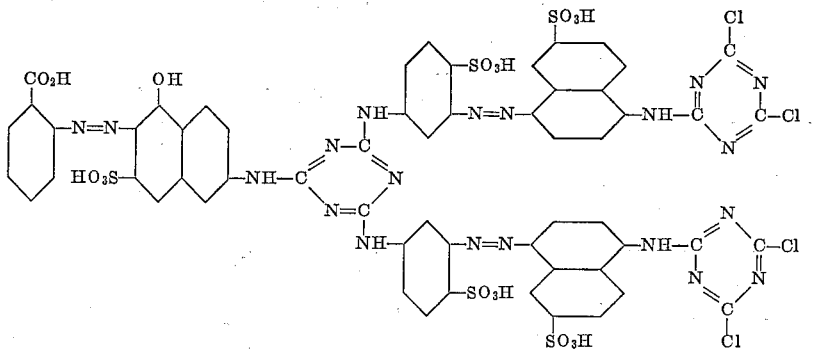

It dyes cellulosic fibres or leather in brown shades fast to light and wet treatments.

By replacing the 9.8 parts of the sodium salt of 1-naphthylamine-6-sulphonic acid by 47 parts of m-toluidine, there is again obtained a dyestuff having similar properties and shade.

By replacing the 42 parts of the sodium salt of 1:3-phenylenediamine-4-sulphonic acid used in the above example by 42 parts of the sodium salt of 1:4-phenylenediamine-3-sulphonic acid there is obtained a dyestuff having similar properties and shade.

*Example 72*

Following the procedure of Example 34, cyanuric chloride is condensed with 1 mole each of the copper complex of 2-(4″-amino-3″-sulphophenylamino) - 6 - (2′-carboxyphenylazo)-5-naphthol-7-sulphonic acid, 1,4-phenylene diamine-2-sulphonic acid and ammonia, the product is diazotised and coupled with 1-(4′-amino-3′-sulphophenyl)-3-methyl-5-pyrazolone and the resultant product is condensed with 1 mole of cyanuric chloride.

The dyestuff obtained colours cellulose textile materials and leather in brown shades. It is the 1:1 copper complex of the formula:

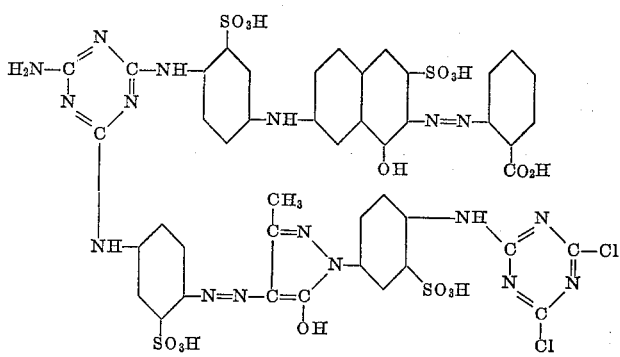

*Example 73*

Cyanuric chloride is condensed with one mole of the 1:1-copper complex of 2-(4″-methylamino-3″-sulphophenylamino)-6-(2′-carboxyphenylazo) - 5 - naphthol-7-sulphonic acid.

To a solution of 42.2 parts of the disodium salt of the resultant product, there is added a solution of 14.55 parts of the sodium salt of 1-(4′-amino-3′-sulphophenyl)-3-methyl-5-pyrazolone in 200 parts of water and the mixture is stirred for 2 hours at 40° C. keeping the pH at 7 by adding sodium carbonate solution. The mixture is cooled to 5° C. and a suspension of diazotised 5-(2′,4′-dichloro-s-triazinylamino)aniline-2-sulphonic acid (obtained from 9.4 parts of 1,3-phenylene diamine-4-sulphonic acid) in 400 parts of water is added.

The mixture is stirred for 16 hours at 5–10° C. and pH 7, then 4 parts of sodium diethylmetanilate, 0.25 part of sodium bisulphate and 230 parts of salt are added. The precipitated dyestuff is filtered off, washed with acetone, mixed with 2 parts of sodium diethylmetanilate and 0.125 part of sodium bisulphate and dried.

The product is the 1:1-copper complex of the compound of the formula:

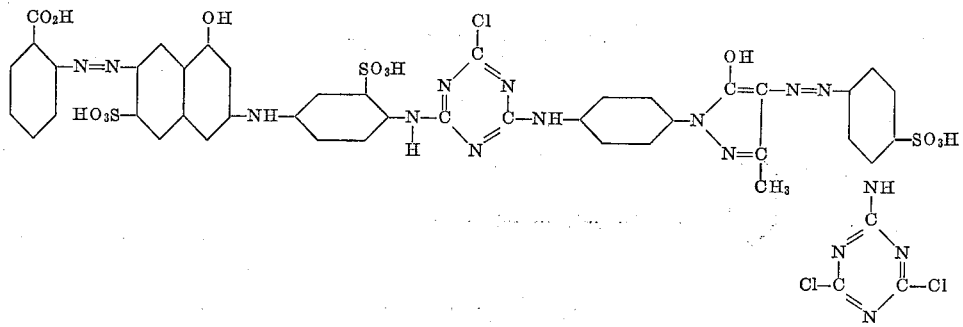
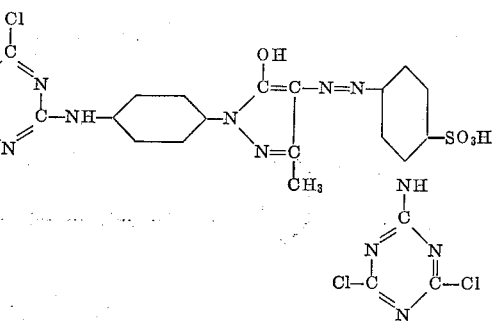

It dyes cellulose textile materials and leather in red brown shades.

I claim:
1. The metal complexes selected from the class consisting of 1:1-copper, 1:2-chromium and 1:2-cobalt complexes of bisazo dyestuffs of the formula:

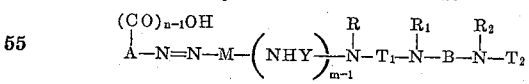

wherein
A is a radical selected from the class consisting of o-phenylene and o-naphthylene radicals,
$n$ has one of the values 1 and 2, M is a 1-hydroxy-3-sulphonaphthalene radical connected to the azo group in the 2 position of the naphthalene nucleus and to the

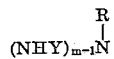

group in one of the 6- and 7-positions of the naphthalene nucleus, Y is selected from the class consisting of m-phenylene, p-phenylene, monosulpho-m-phenylene and monosulpho-p-phenylene, $m$ has one of the values 1 and 2, R, $R_1$ and $R_2$ are independently selected from the class consisting of hydrogen and alkyl radicals having from 1 to 4 inclusive, carbon atoms, $T_1$ is selected from the class consisting of s-triazine and pyrimidine radicals, $T_2$ is selected from the class consisting of 2,4-dichloro-6-s-triazinyl, 5-cyano-2,4-dichloro-6-pyrimidyl, 5-cyano-4,6-dichloro-2-pyrimidyl, 2,4,5-trichloro-6-pyrimidyl and 4,5,6-trichloro-2-pyrimidyl, and B is the radical of a monoazo compound of the formula: —D—N═N—E— wherein D is selected from the class consisting of phenylene, monosulphophenylene, monosulphophenylene, monochlorophenylene, mononitro phenylene and monocarboxyphenylene and E is an aromatic nucleus consisting of the residue of a coupling component H—E—NHR which coupling component is selected from the class consisting of para coupling primary and secondary amines of the benzene and naphthalene series and 5-pyrazolones carrying in the 1-position of the pyrazole nucleus an at most dicyclic radical of the benzene series to which the amino group is attached.

2. The 1:2-chromium complex of any dyestuff of the formula:

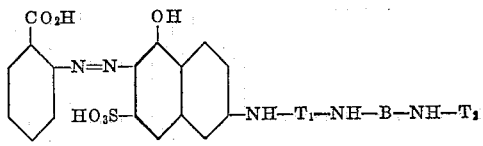

wherein
$T_1$ is selected from the class consisting of s-triazine and pyrimidine radicals,
$T_2$ is selected from the class consisting of 2,4-dichloro-6-s-triazinyl, 5-cyano-2,4-dichloro-6-pyrimidyl, 5-cyano-4,6-dichloro-2-pyrimidyl, 2,4,5-trichloro-6-pyrimidyl and 4,5,6-trichloro-2-pyrimidyl, and
B is the radical of a monoazo compound of the formula: —D—N═N—E— wherein D is selected from the class consisting of phenylene, monosulphophenylene, monochlorophenylene, mononitrophenylene and monocarboxyphenylene and E is an aromatic nucleus consisting of the residue of a coupling component H—E—NHR which coupling component is selected from the class consisting of para-coupling primary and secondary amines of the benzene and naphthalene series and 5-pyrazolones carrying in the 1-position of the pyrazole nucleus an at most dicyclic radical of the benzene series to which the amino group is attached.

3. The 1:2-chromium complex of the dyestuff of the formula:

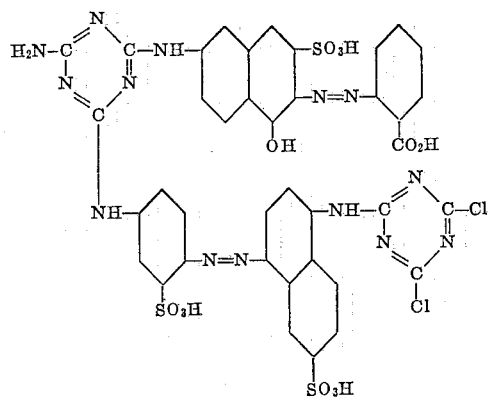

4. The 1:2-chromium complex of the dyestuff of the formula:

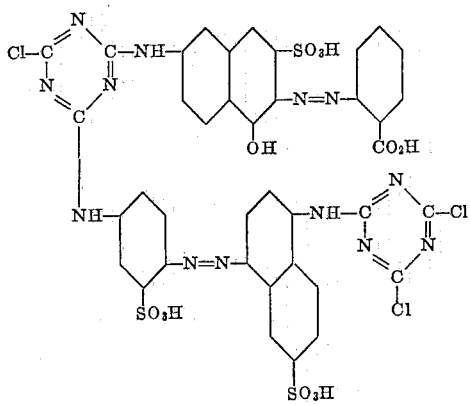

5. The 1:2-chromium complex of the dyestuff of the formula:

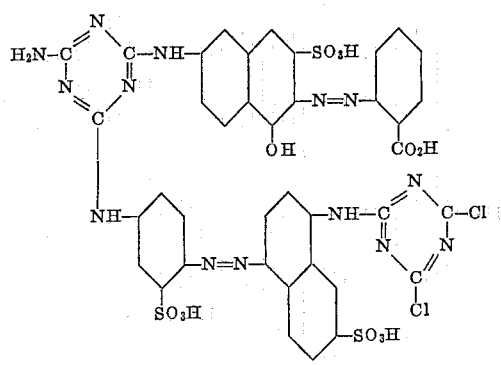

6. The 1:2-chromium complex of the dyestuff of the formula:

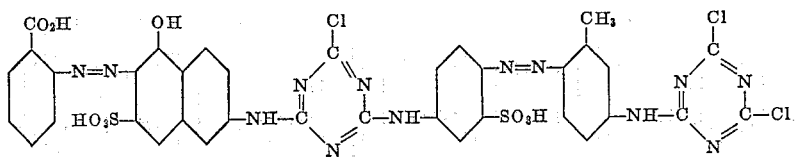

7. The 1:2-chromium complex of the dyestuff of the formula:
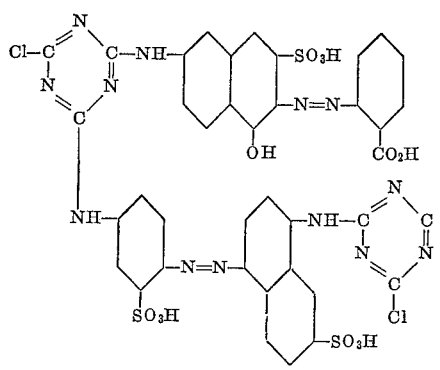
No references cited.
CHARLES B. PARKER, *Primary Examiner.*
D. M. PAPUGA, *Assistant Examiner.*